(12) United States Patent
Manabe (10) Patent No.: US 6,636,698 B2
(45) Date of Patent: Oct. 21, 2003

(54) ZOOM ACTUATING APPARATUS FOR CAMERAS

(75) Inventor: Mitsuo Manabe, Saitama-ken (JP)

(73) Assignee: Fuji Photo Optical Co., Ltd., Saitama-ken (JP)

( * ) Notice: Subject to any disclaimer, the term of this patent is extended or adjusted under 35 U.S.C. 154(b) by 0 days.

(21) Appl. No.: 10/109,420

(22) Filed: Mar. 27, 2002

(65) Prior Publication Data

US 2002/0141745 A1 Oct. 3, 2002

(30) Foreign Application Priority Data

Mar. 29, 2001 (JP) ........................................ 2001-095505

(51) Int. Cl.[7] .............................. G03B 5/00; G03B 15/03
(52) U.S. Cl. ........................ 396/85; 396/177; 396/349
(58) Field of Search ............................. 396/72, 85, 87, 396/177, 349

(56) References Cited

U.S. PATENT DOCUMENTS

| | | | |
|---|---|---|---|
| 5,617,167 A | 4/1997 | Kaji | 396/448 |
| 5,749,003 A * | 5/1998 | Tanabe | 396/177 |
| 5,802,404 A | 9/1998 | Nishimura | 396/72 |
| 5,862,416 A | 1/1999 | Nishimura | 396/72 |
| 6,254,289 B1 | 7/2001 | Manabe et al. | 396/448 |
| 6,456,791 B1 * | 9/2002 | Nishimura et al. | 396/72 |

\* cited by examiner

*Primary Examiner*—W. B. Perkey
(74) *Attorney, Agent, or Firm*—Joseph Levi; Clifford Chance US LLP

(57) ABSTRACT

A lens barrel is provided with a fixed cylinder, a movable cylinder supported in the fixed cylinder, and a helicoid mechanism for moving the movable cylinder along the optical axis direction through engagement of an internal helicoid of the fixed cylinder and an external helicoid of the movable cylinder. The helicoid mechanism is provided with an unengaged region, in which the internal helicoid and the external helicoid are in an unengaged state, within a rotation region between a collapsed state of the movable cylinder and a wide end of the movable cylinder. An opening or closing operation of a lens barrier is performed by the rotation of the movable cylinder in the unengaged region of the helicoid mechanism.

3 Claims, 5 Drawing Sheets

ZOOM ACTUATING APPARATUS FOR CAMERAS

CROSS-REFERENCE TO RELATED APPLICATION

The application claims priority to Japanese patent application number 2001-095505 filed Mar. 29,2001.

BACKGROUND OF THE INVENTION

1. Field of the Invention

This invention relates to a zoom actuating apparatus for a camera, wherein an opening or closing operation of a lens barrier and, when necessary, a projecting or retracting operation of an electronic flashlight are performed within a period of shifting of a movable cylinder of a lens barrel from a collapsed state to a wide end or from the wide end to the collapsed state.

2. Description of the Related Art

Cameras, in which a movable cylinder of a lens barrel is delivered forwardly along an optical axis direction from a camera main body and a photograph is thereby taken, have heretofore been constituted such that, for example, in accordance with an operation for preparing for photographing, in which an electric power source button is set in an on state, the movable cylinder is shifted from a collapsed state, in which the movable cylinder is accommodated within the camera main body, to a wide end for wide angle photographing. Also, in accordance with a zooming operation, the movable cylinder is shifted to a tele end for telephotographing. Further, within the period of shifting of the movable cylinder from the collapsed state to the wide end or from the wide end to the collapsed state, an opening or closing operation of a lens barrier, which covers a lens opening section formed in a front cover for forward and backward movements of the movable cylinder of the lens barrel, is performed. In the cases of cameras, in which an electronic flashlight is housed in a camera main body, a projecting or retracting operation of the electronic flashlight is finished within the period of shifting of the movable cylinder from the collapsed state to the wide end or from the wide end to the collapsed state. A camera constituted in such a manner is described in, for example, Japanese Unexamined Patent Publication No. 2000-111975.

Movements of the movable cylinder along the optical axis direction are performed with a helicoid mechanism, which is formed between the movable cylinder and a fixed cylinder for holding the movable cylinder. By way of example, the movable cylinder is actuated for rotation by zoom actuating means. In several types of cameras, the opening or closing operation of the lens barrier and the projecting or retracting operation of the electronic flashlight are performed in the manner interlocked with the actuation by the zoom actuating means for moving the movable cylinder along the optical axis direction.

Figure 6A:
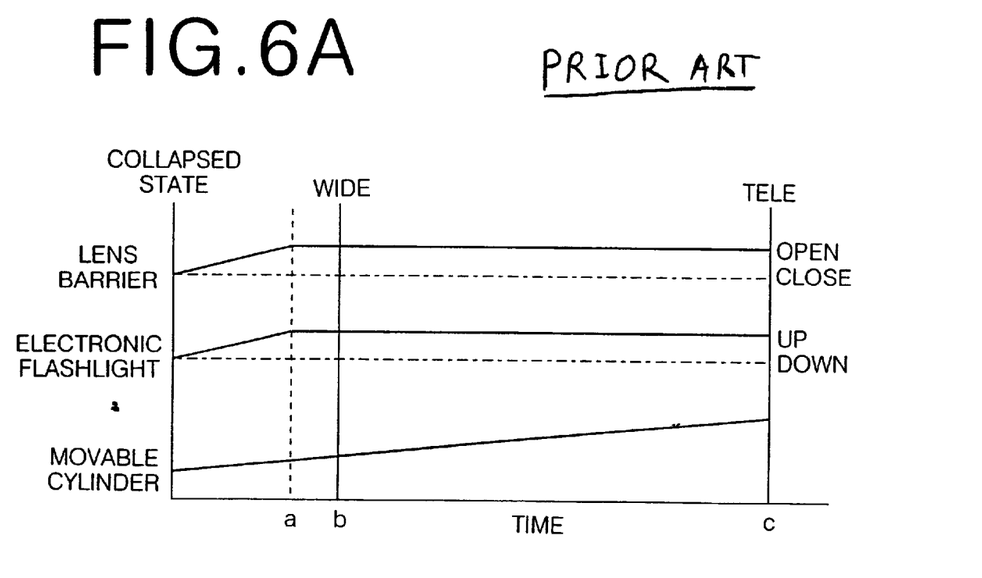
FIG. 6A is a timing chart showing a first example of an operation of a movable cylinder of a lens barrel and operations interlocked with the operation of the movable cylinder in a conventional camera.
Figure 6B:
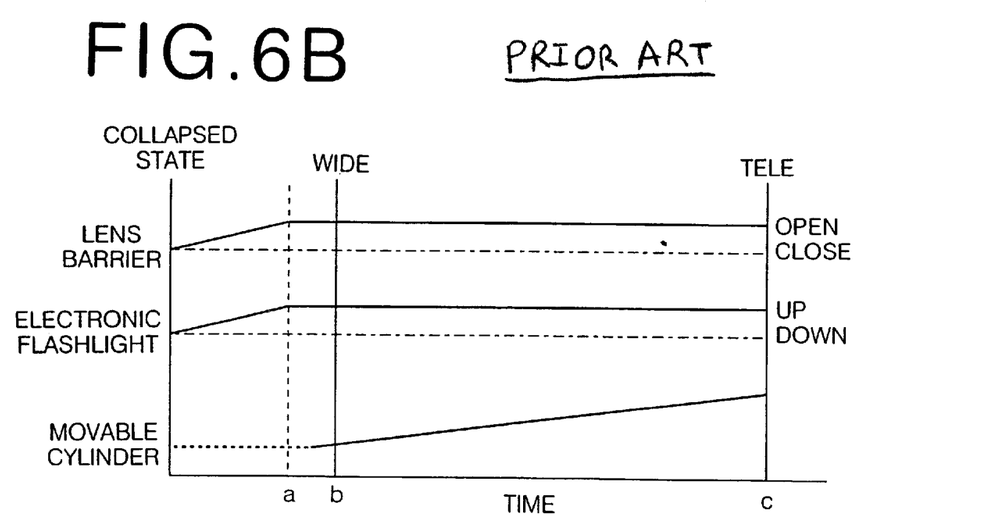
FIG. 6B is a timing chart showing a second example of an operation of a movable cylinder of a lens barrel and operations interlocked with the operation of the movable cylinder in a conventional camera.

FIG. 6A is a timing chart showing a first example of an operation of a movable cylinder of a lens barrel and operations interlocked with the operation of the movable cylinder in a conventional camera. FIG. 6B is a timing chart showing a second example of an operation of a movable cylinder of a lens barrel and operations interlocked with the operation of the movable cylinder in a conventional camera. FIGS. 6A and 6B show the cases where the movable cylinder of the lens barrel is operated from the collapsed state to the tele end. In the first example shown in FIG. 6A, the helicoid mechanism is always in an engaged state, and the movable cylinder is delivered linearly from the collapsed state via the wide end to the tele end. Also, within the period of movement of the movable cylinder from the collapsed state to the wide end along the optical axis direction, the lens barrier is operated from a closed state to an open state, and the electronic flashlight is operated from a housed state (i.e., a down state) to a projected state (i.e., an up state). In the second example shown in FIG. 6B, the helicoid mechanism is always in an engaged state. However, in the second example, the zoom actuating means is provided with a gear idling region indicated by the broken line in FIG. 6B, which gear idling region is formed as part of the region ranging from the collapsed state to the wide end. In the gear idling region, the movable cylinder is not rotated and not moved along the optical axis direction. Also, in the second example, by the zoom actuating means which is operating in the gear idling region, the lens barrier is operated from the closed state to the open state, and the electronic flashlight is operated from the housed state to the projected state.

However, in the first example shown in FIG. 6A, the operation of the zoom actuating means is always accompanied by the movement of the movable cylinder along the optical axis direction. Therefore, in cases where the collapsed state of the movable cylinder and the wide end of the movable cylinder are close to each other, and the distance of movement of the movable cylinder between the collapsed state and the wide end along the optical axis direction is short, it becomes necessary to utilize interlocking mechanisms, with which the opening or closing operation of the lens barrier and the projecting or retracting operation of the electronic flashlight are capable of being performed quickly within a short period of the movement of the movable cylinder between the collapsed state and the wide end along the optical axis direction. However, it is not always easy to constitute such interlocking mechanisms. Particularly, as the camera size is made small in recent years, the distance between the lens barrier, which is associated with the camera main body, and the front end of the movable cylinder along the optical axis direction becomes short. In such cases, it is necessary for the opening operation of the lens barrier to be performed quickly within a short period before the front end of the movable cylinder strikes against the lens barrier. In such cases, the reliability, with which the opening operation of the lens barrier is performed quickly, cannot always be kept high.

In the second example shown in FIG. 6B, in cases where the distance of movement of the movable cylinder between the collapsed state and the wide end along the optical axis direction is short, the opening or closing operation of the lens barrier and the projecting or retracting operation of the electronic flashlight are capable of being performed. However, in the second example, wherein the zoom actuating means is provided with the gear idling mechanism, the gear system cannot be kept simple. Therefore, the second example described above is not advantageous from the view point of reduction in camera size and reduction in cost of the camera.

SUMMARY OF THE INVENTION

The primary object of the present invention is to provide a zoom actuating apparatus for a camera, wherein an opening or closing operation of a lens barrier is performed with a simple mechanism when a movable cylinder of a lens barrel shifts from a collapsed state to a wide end or from the wide end to the collapsed state.

Another object of the present invention is to provide a zoom actuating apparatus for a camera, wherein the opening or closing operation of the lens barrier and a projecting or retracting operation of an electronic flashlight are performed with a simple mechanism when the movable cylinder of the lens barrel shifts from the collapsed state to the wide end or from the wide end to the collapsed state.

The present invention provides a zoom actuating apparatus for a camera, the apparatus comprising:

i) a lens barrel provided with a fixed cylinder, a movable cylinder supported in the fixed cylinder such that the movable cylinder is capable of moving along an optical axis direction, and a helicoid mechanism for moving the movable cylinder along the optical axis direction through engagement of an internal helicoid, which is formed on an inner circumferential surface of the fixed cylinder, and an external helicoid, which is formed on an outer circumferential surface of the movable cylinder, ii) zoom actuating means for actuating the movable cylinder for rotation, and iii) a lens barrier interlocked with the rotation of the movable cylinder such that the lens barrier operates to open or close an opening section formed in a front cover, through which opening section the movable cylinder moves forwardly and backwardly, in accordance with the rotation of the movable cylinder, wherein the helicoid mechanism is provided with an unengaged region, in which the internal helicoid and the external helicoid are in an unengaged state, within a rotation region between a collapsed state of the movable cylinder and a wide end of the movable cylinder, and the opening or closing operation of the lens barrier is performed by the rotation of the movable cylinder in the unengaged region of the helicoid mechanism.

The zoom actuating apparatus for a camera in accordance with the present invention may be modified such that a projecting or retracting operation of an electronic flashlight is also performed by the rotation of the movable cylinder in the unengaged region of the helicoid mechanism.

Also, the zoom actuating apparatus for a camera in accordance with the present invention should preferably be modified such that the helicoid mechanism comprises:

a) a flat section, which is formed at a certain part of the internal helicoid of the fixed cylinder, the flat section extending in a direction normal to the optical axis direction and at a position of an end of the internal helicoid, b) a cam groove, which continues from the flat section and extends in parallel with the internal helicoid, a groove wall of the cam groove, which groove wall is formed on the side opposite to the flat section, is projected beyond the position of the flat section, and c) a protrusion, which is formed at a certain part of the external helicoid of the movable cylinder and is capable of coming into engagement with the cam groove from a state in abutment with the flat section, and the state, in which the protrusion is in abutment with the flat section, is set as the unengaged region of the helicoid mechanism.

With the zoom actuating apparatus for a camera in accordance with the present invention, the helicoid mechanism formed between the movable cylinder and the fixed cylinder is provided with the unengaged region, in which the internal helicoid and the external helicoid are in the unengaged state, within the rotation region between the collapsed state of the movable cylinder and the wide end of the movable cylinder. Also, the opening or closing operation of the lens barrier is performed by the rotation of the movable cylinder in the unengaged region of the helicoid mechanism. Therefore, it is not necessary for an idling mechanism to be located in a gear system of zoom actuating means, and the opening or closing operation of the lens barrier is capable of being performed in the state, in which the movable cylinder does not move along the optical axis direction. Accordingly, in cases where the spacing between the front end of the movable cylinder and the lens barrier is small, the opening or closing operation of the lens barrier is capable of being performed reliably. Also, the helicoid mechanism is simple and reliable. The zoom actuating apparatus for a camera in accordance with the present invention is advantageous from the view point of reduction in camera size and reduction in cost of the camera.

DESCRIPTION OF THE PREFERRED EMBODIMENTS

The present invention will hereinbelow be described in further detail with reference to the accompanying drawings.

Figure 1:
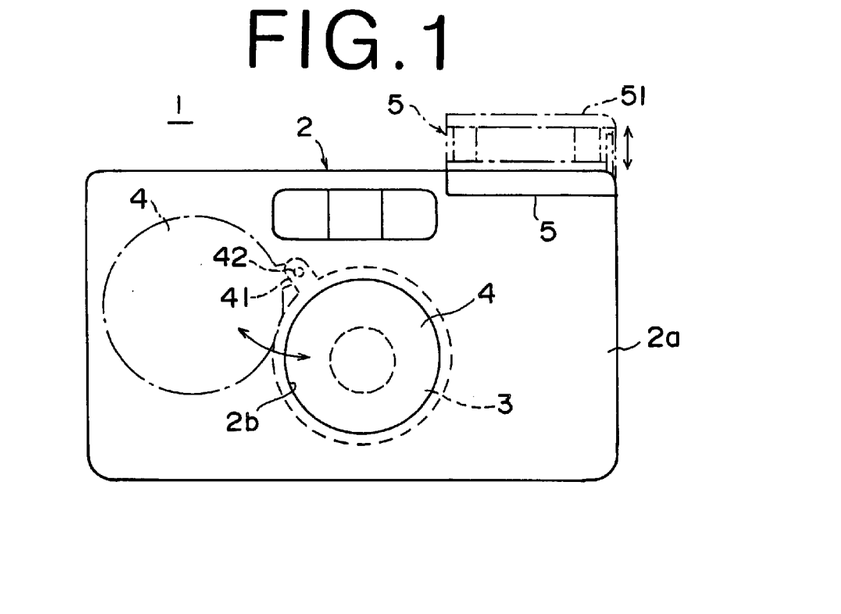
FIG. 1 is a front view showing an example of a camera, in which an embodiment of the zoom actuating apparatus for a camera in accordance with the present invention is employed.
Figure 2:
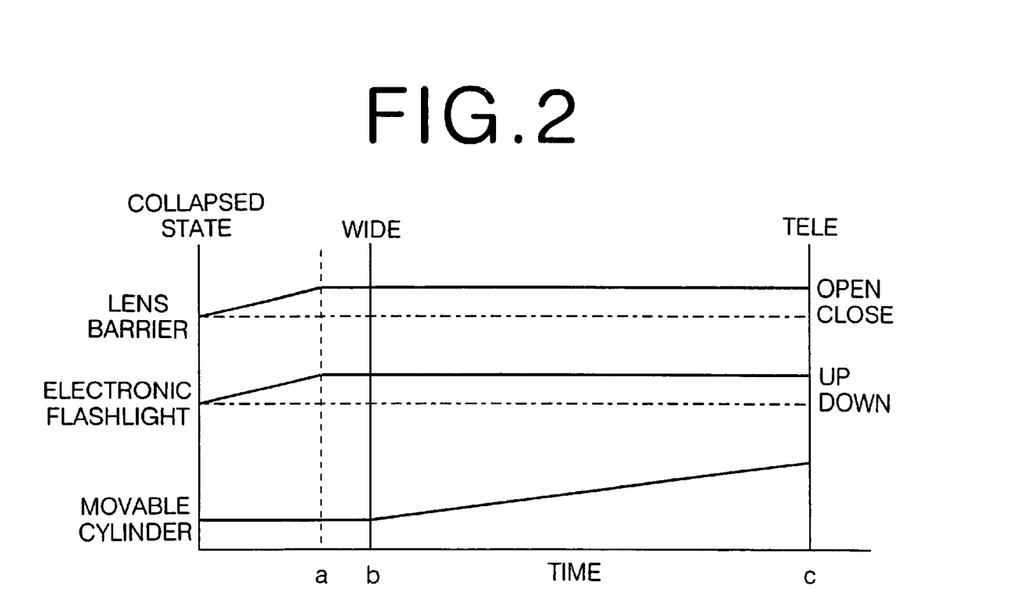
FIG. 2 is a timing chart showing an operation of a movable cylinder of a lens barrel and operations interlocked with the operation of the movable cylinder in the embodiment of the zoom actuating apparatus for a camera in accordance with the present invention.
Figure 3:
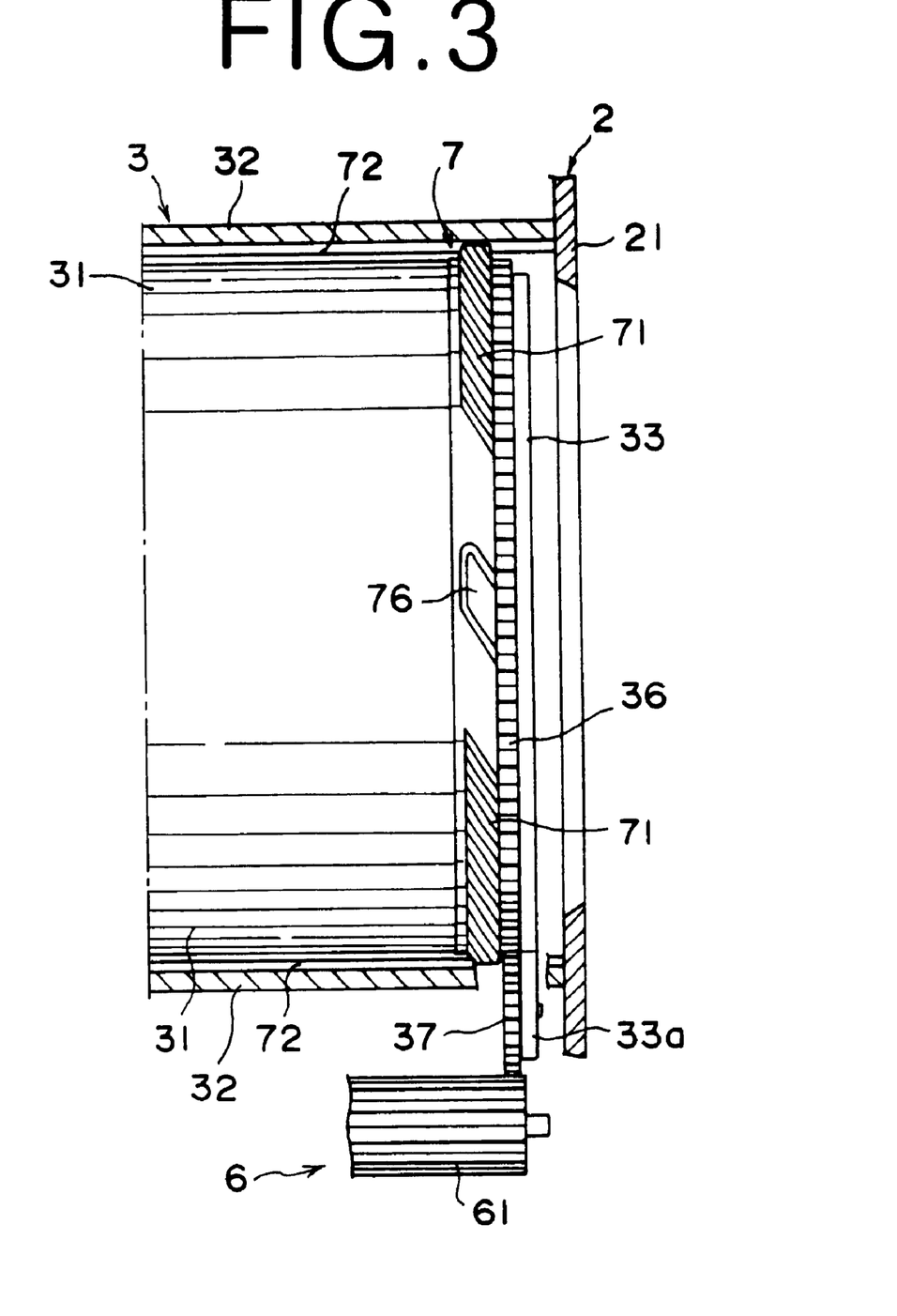
FIG. 3 is a sectional view showing a major part of the lens barrel.
Figure 4:
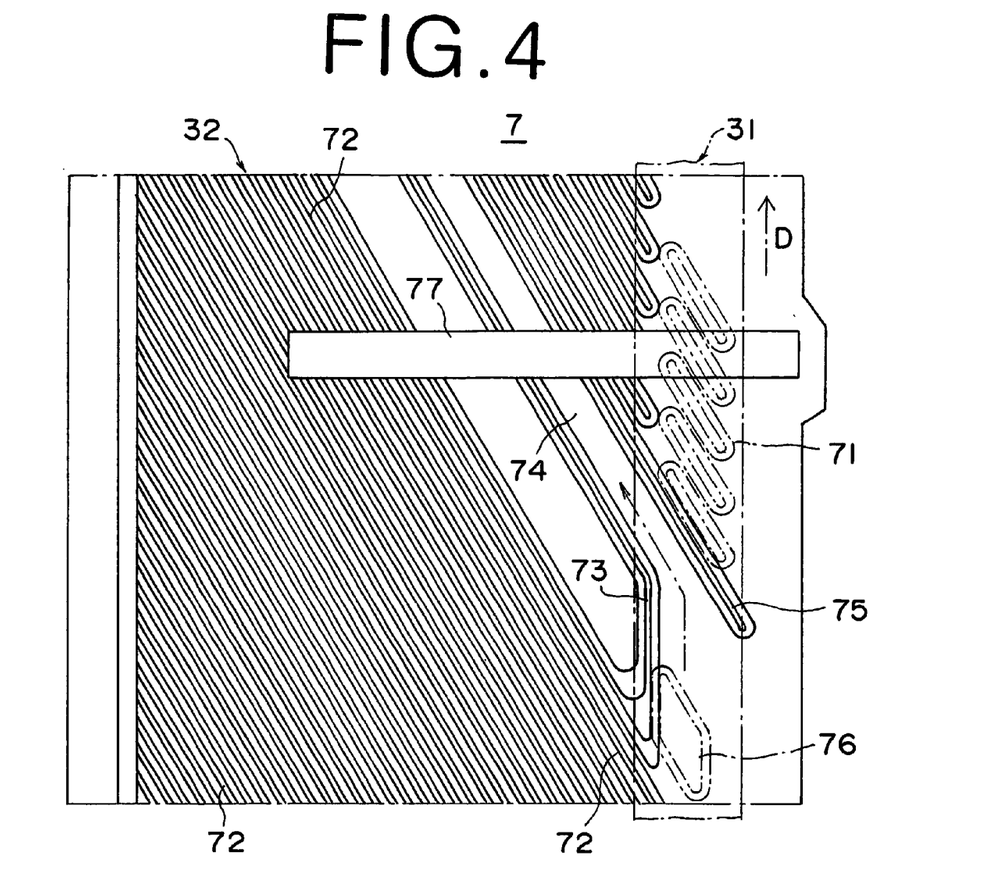
FIG. 4 is a developed view showing a helicoid mechanism.
Figure 5:
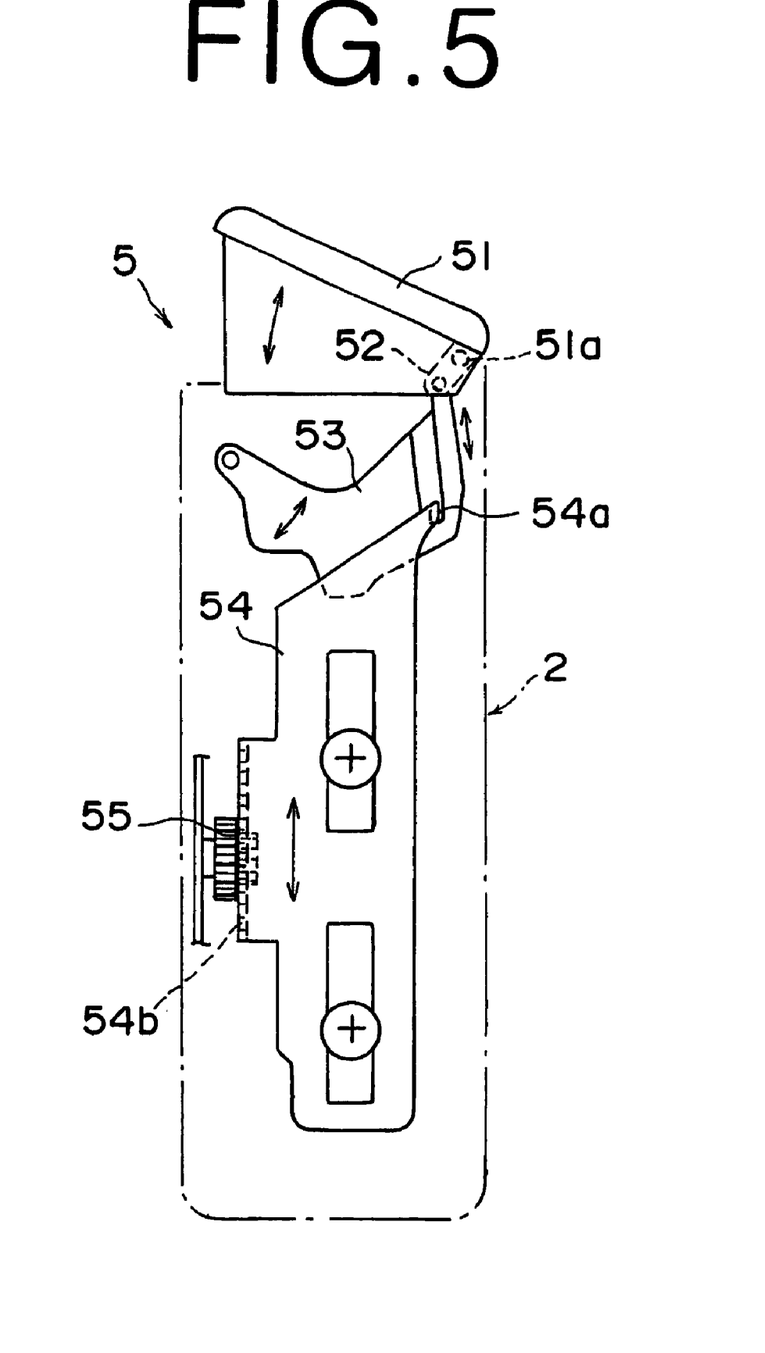
FIG. 5 is a schematic view showing an electronic flashlight interlocking mechanism.

FIG. 1 is a front view showing an example of a camera, in which an embodiment of the zoom actuating apparatus for a camera in accordance with the present invention is employed. FIG. 2 is a timing chart showing an operation of a movable cylinder of a lens barrel and operations interlocked with the operation of the movable cylinder in the embodiment of the zoom actuating apparatus for a camera in accordance with the present invention. FIG. 3 is a sectional view showing a major part of the lens barrel. FIG. 4 is a developed view showing a helicoid mechanism. FIG. 5 is a schematic view showing an electronic flashlight interlocking mechanism.

As illustrated in FIG. 1, a camera main body 2 of a camera 1 is provided with a zoom lens barrel 3. A front cover 2a of the camera main body 2 has a lens opening section 2b, through which a movable cylinder 31 of the lens barrel 3 described later moves forwardly and backwardly. The camera main body 2 is also provided with a lens barrier 4, which closes the lens opening section 2b when the camera 1 is not used, and which opens the lens opening section 2b when the camera 1 is to be used. Further, an electronic flashlight 5 is located at the top part of the camera main body 2. The electronic flashlight 5 is housed in the camera main body 2 when the camera 1 is not used. Also, the electronic flashlight 5 is projected upwardly when the camera 1 is to be used.

When the camera 1 is not used, the movable cylinder 31 of the lens barrel 3 is set by zoom actuating means 6 (illustrated in FIG. 3), which will be described later, in a collapsed state, in which the movable cylinder 31 is accommodated within the camera main body 2. For example, in accordance with an operation for preparing for photographing, in which an electric power source button is set in an on state, the movable cylinder 31 is shifted from the collapsed state to a wide end (i.e., the state in which widest angle photographing is capable of being performed) Also, in accordance with an operation of a zooming switch, the movable cylinder 31 is shifted from the wide end to a tele end (i.e., the state in which most distant telephotographing is capable of being performed). In this manner, the movable cylinder 31 is capable of being delivered forwardly and retracted along the optical axis direction.

FIG. 2 shows the operations from the collapsed state to the tele end. As illustrated in FIG. 2, in a period from the collapsed state to the wide end at a point "b," the movable cylinder 31 of the lens barrel 3 is not moved along the optical axis direction and is driven for rotation. The lens barrier 4 and the electronic flashlight 5 are interlocked with the rotation of the movable cylinder 31, such that the opening operation of the lens barrier 4 and the projecting operation of the electronic flashlight 5 are finished at a point "a," which is within the period from the collapsed state to the wide end at the point "b."

Specifically, as illustrated in FIG. 3, the lens barrel 3 is provided with a fixed cylinder 32, which is secured to a frame 21 of the camera main body 2, and the movable cylinder 31 held within the fixed cylinder 32 such that the movable cylinder 31 is capable of moving along the optical axis direction. Though not shown, a zoom lens, a shutter, and the like, are accommodated within the movable cylinder 31.

The movable cylinder 31 is actuated for rotation by the zoom actuating means 6. In accordance with the rotating operation of the movable cylinder 31, the movable cylinder 31 is moved along the optical axis direction by a helicoid mechanism 7, which is formed between the movable cylinder 31 and the fixed cylinder 32. A support plate 33 is located at a back end section of the movable cylinder 31. A portion of the support plate 33 is engaged with a longitudinal groove (not shown) of the fixed cylinder 32, such that the support plate 33 does not rotate. The support plate 33 moves rectilinearly along the optical axis direction together with the movable cylinder 31.

A gear 36 is formed at the outer periphery of the back end section of the movable cylinder 31. The gear 36 engages with a transmission gear 37. The transmission gear 37 is supported by a projected section 33a of the support plate 33 and is rectilinearly moved together with the movable cylinder 31. Actually, the transmission gear 37 is located at an angle position different from the cross-sectional position of the fixed cylinder 32 shown in FIG. 3. However, in FIG. 3, as an aid in facilitating the explanation, the transmission gear 37 is shown at the illustrated cross-sectional position of the fixed cylinder 32. The fixed cylinder 32 has a longitudinal groove (not shown) at the position corresponding to the transmission gear 37. The longitudinal groove of the fixed cylinder 32 allows the transmission gear 37 to move along the optical axis direction. Also, a driving gear 61 of the zoom actuating means 6 is engaged with the transmission gear 37 and causes the movable cylinder 31 to rotate. Rotation force of a driving motor acting as a zoom motor (not shown) is transmitted to the driving gear 61 via a gear train. The driving gear 61 is long along the optical axis direction. Therefore, when the transmission gear 37 is moved accompanying the movement of the movable cylinder 31 along the optical axis direction, the driving gear 61 continues to engage with the transmission gear 37 and transmits the rotation force to the transmission gear 37.

The helicoid mechanism 7 is constituted of an external helicoid 71, which is formed on an outer circumferential surface of the back section of the movable cylinder 31, and an internal helicoid 72, which is formed on an inner circumferential surface of the fixed cylinder 32. In accordance with the rotating operation of the movable cylinder 31, the movable cylinder 31 is moved along the optical axis direction through the engagement of the external helicoid 71 and the internal helicoid 72 with each other.

Also, the helicoid mechanism 7 has an unengaged region between the collapsed state of the movable cylinder 31 and the wide end of the movable cylinder 31. In the unengaged region of the helicoid mechanism 7, the movable cylinder 31 is not moved along the optical axis direction, and only the rotating operation of the movable cylinder 31 is allowed. In FIG. 4, a developed pattern of the internal helicoid 72 of the fixed cylinder 32 is indicated by the solid lines, and a developed pattern of the external helicoid 71 of the movable cylinder 31, which is in the collapsed state, is indicated by the single-dot chained lines. In cases where the movable cylinder 31 is to be moved from the collapsed state to the wide end and then to the tele end, the movable cylinder 31 is rotated upwardly in FIG. 4, i.e. in the direction indicated by the arrow D. In the collapsed state of the movable cylinder 31 shown in FIG. 4, in which the movable cylinder 31 has been retracted, the external helicoid 71 of the movable cylinder 31 is spaced apart backwardly from the internal helicoid 72 of the fixed cylinder 32, and the external helicoid 71 and the internal helicoid 72 are in the unengaged state. In FIG. 4, the ground area of the fixed cylinder 32 is the inner circumferential planar area (i.e., the bottom area), and the internal helicoid 72 constituted of streak-like protrusions is formed obliquely on the ground area of the fixed cylinder 32. The two narrow-spaced parallel lines, whose ends are connected to each other, represent the top surface of each thread of the internal helicoid 72, and the two sides of top surface of each thread are formed as slant surfaces.

A predetermined angle range of the internal helicoid 72 of the fixed cylinder 32 has been removed, and a flat section 73 is formed at the removed area of the internal helicoid 72 of the fixed cylinder 32. The flat section 73 extends in the circumferential direction (i.e., in the direction normal to the optical axis direction) and at a position approximately identical with the position of the back end section of the internal helicoid 72. Streak-like protrusions, which are parallel with the internal helicoid 72, are formed at the two ends of the flat section 73. Also, a cam groove 74, which is parallel with the internal helicoid 72, continues from the flat section 73 toward the side in the direction indicated by the arrow D.

Further, an extended groove wall 75 of the cam groove 74, which groove wall is formed on the side opposite to the flat section 73, is projected toward the side backward from the flat section 73. An angle range of the external helicoid 71 of the movable cylinder 31, which angle range is approximately two times as wide as the removed area of the internal helicoid 72 of the fixed cylinder 32, has been removed. A protrusion 76 is formed approximately at the center of the removed area of the external helicoid 71 of the movable cylinder 31 (as illustrated in FIG. 3) The protrusion 76 is capable of coming into engagement with the cam groove 74 from a state in abutment with the flat section 73. The state, in which the protrusion 76 is in abutment with the flat section 73, is set as the unengaged region of the helicoid mechanism 7. In FIG. 4, reference numeral 77 represents a groove, through which a flexible circuit board connected to the movable cylinder 31 passes.

In the collapsed state shown in FIG. 4, the protrusion 76 of the movable cylinder 31 is in the unengaged state, in which the protrusion 76 is located at a position spaced apart from the cam groove 74 of the flat section 73. When the movable cylinder 31 is actuated by the zoom actuating means 6 so as to rotate in the direction indicated by the arrow D, since the external helicoid 71 of the movable cylinder 31 is not yet engaged with the internal helicoid 72 of the fixed cylinder 32, the movable cylinder 31 rotates at the position in the collapsed state, and the protrusion 76 of the movable cylinder 31 moves along the flat section 73. By the actuation for rotation of the movable cylinder 31 in the unengaged region of the helicoid mechanism 7, the opening or closing operation of the lens barrier 4 and the projecting or retracting operation of the electronic flashlight 5 are performed. Thereafter, the movable cylinder 31 is further rotated, and a leading end section of the protrusion 76 comes into abutment with the extended groove wall 75 of the cam groove 74 (i.e., the movable cylinder 31 reaches the wide end). At the wide end of the movable cylinder 31, the unengaged region of the helicoid mechanism 7 is finished. When the movable cylinder 31 is actuated for rotation in the direction indicated by the arrow D from the wide end, the protrusion 76 moves along the extended groove wall 75 into the cam groove 74, and the movable cylinder 31 begins moving forwardly. At the same time, the external helicoid 71 of the movable cylinder 31 engages with the internal helicoid 72 of the fixed cylinder 32, and the movable cylinder 31 moves forwardly in parallel with the optical axis direction. The rotation and the forward movement of the movable cylinder 31 continues up to the position of the tele end.

An interlocking mechanism of the lens barrier 4 will be described hereinbelow. As illustrated in FIG. 1, the lens barrier 4 has a circular disk-like shape. The lens barrier 4 has a protruding piece 41 at a part of the outer periphery. The protruding piece 41 is supported for rotation around a pin 42 acting as a supporting point. The lens barrier 4 is capable of being rotated around the pin 42 to the position indicated by the single-dot chained line and thereby opening the lens opening section 2b. The protruding piece 41 is urged toward the direction, which closes the lens opening section 2b, by a torsional spring (not shown), which is fitted to the pin 42. By the urging force of the torsional spring, the closing operation of the lens barrier 4 is performed. Also, the protruding piece 41 is provided with an engagement pin (not shown), which projects from the protruding piece 41. An engagement piece (not shown), which moves in accordance with the rotation of the movable cylinder 31, comes into abutment with the engagement pin of the protruding piece 41 and performs the opening operation of the lens barrier 4 against the urging force of the torsional spring fitted to the pin 42. The interlocking mechanism of the lens barrier 4 is also provided with a mechanism for cushioning the rotation of the movable cylinder 31 after the lens barrier 4 has fully opened the lens opening section 2b. In this manner, the opening or closing operation of the lens barrier is performed with the interlocking characteristics shown in FIG. 2. As the interlocking mechanism of the lens barrier 4, one of various known mechanism (as disclosed in, for example, Japanese Unexamined Patent Publication Nos. 2000-111975, 2000-111973, and 2000-111972) may be employed.

An example of an interlocking mechanism of the electronic flashlight 5 will be described hereinbelow. As illustrated in FIG. 1, by way of example, a base section supporting shaft 51a of an electronic flashlight main body (an electronic flashlight case housing) 51 is supported at the top part of the camera main body 2 such that the electronic flashlight main body 51 is capable of being rotated between a projected position and a retracted position. The electronic flashlight main body 51 is urged by a torsional spring (not shown) toward the projecting direction. The electronic flashlight main body 51 is provided with an arm section 52 for performing the projecting or retracting movement of the electronic flashlight main body 51. The arm section 52 of the electronic flashlight main body 51 is engaged with a back end section of an electronic flashlight lever 53, which is supported for swinging movement by the camera main body 2. When the electronic flashlight lever 53 is swung in the direction which pulls down the arm section 52, the electronic flashlight main body 51 is swung around the base section supporting shaft 51a and retracted to the position housed within the camera main body 2.

Also, the camera main body 2 is provided with an electronic flashlight rack 54, which is capable of sliding vertically. A top end engagement piece 54a of the electronic flashlight rack 54 engages with the electronic flashlight lever 53 in order to perform the swinging operation of the electronic flashlight lever 53. The electronic flashlight rack 54 is provided with a vertically extending rack gear section 54b. An interlocking gear 55 is engaged with the rack gear section 54b. Rotation driving force for the movable cylinder 31 is transmitted from the zoom actuating means 6 described above to the interlocking gear 55 via a gear train (not shown).

In cases where the movable cylinder 31 is actuated for rotation in the unengaged region of the helicoid mechanism 7 within the period from the collapsed state of the movable cylinder 31 to the wide end of the movable cylinder 31, the interlocking gear 55 rotates accompanying the actuation for rotation of the movable cylinder 31 and moves the electronic flashlight rack 54 upwardly. As the electronic flashlight rack 54 is moved upwardly, the back end section of the electronic flashlight lever 53 is swung upwardly and releases the pulling down of the arm section 52. Also, the electronic flashlight main body 51 is rotated in the projecting direction by urging force of the torsional spring. In cases where the movable cylinder 31 shifts to the collapsed state, the interlocking gear 55 is rotated reversely, and the electronic flashlight rack 54 is moved downwardly. Also, the electronic flashlight lever 53 is swung so as to pull down the arm section 52, and the electronic flashlight main body 51 is thereby rotated to the housed position. In this manner, the projecting or retracting operation of the electronic flashlight 5 is performed with the interlocking characteristics shown in FIG. 2.

The interlocking mechanism of the electronic flashlight 5 is provided with an electronic flashlight cam (not shown). The electronic flashlight cam acts as a mechanism for altering the position of an illuminant in accordance with the zooming operation after the electronic flashlight main body 51 has been projected from the camera main body 2.

With the aforesaid embodiment of the zoom actuating apparatus for a camera in accordance with the present invention, the helicoid mechanism 7, which is formed between the movable cylinder 31 and the fixed cylinder 32, is provided with the unengaged region between the collapsed state of the movable cylinder 31 and the wide end of the movable cylinder 31, in which unengaged region the external helicoid 71 of the movable cylinder 31 and the internal helicoid 72 of the fixed cylinder 32 do not engage with each other. In accordance with the actuation for rotation of the movable cylinder 31 within the unengaged region of the helicoid mechanism 7, the opening or closing operation of the lens barrier 4 and the projecting or retracting operation of the electronic flashlight 5 are performed in the manner interlocked with the actuation for rotation of the movable cylinder 31. Therefore, the structure of the gear system of the zoom actuating means 6 is capable of being kept simple. Also, the interlocking mechanisms are capable of being kept simple and reliable. Accordingly, the aforesaid embodiment of the zoom actuating apparatus for a camera in accordance with the present invention is advantageous from the view point of reduction in camera size and reduction in cost of the camera.

As the mechanism for opening and closing the lens barrier 4 and the mechanism for projecting and retracting the electronic flashlight 5, various other known mechanisms may be employed. As for cameras having a structure such that the electronic flashlight 5 is not projected and retracted, only the opening and closing operations of the lens barrier 4 may be interlocked with the actuation for rotation of the movable cylinder 31.

What is claimed is:

1. A zoom actuating apparatus for a camera, the apparatus comprising:
   i) a lens barrel provided with a fixed cylinder, a movable cylinder supported in the fixed cylinder such that the movable cylinder is capable of moving along an optical axis direction, and a helicoid mechanism for moving the movable cylinder along the optical axis direction through engagement of an internal helicoid, which is formed on an inner circumferential surface of the fixed cylinder, and an external helicoid, which is formed on an outer circumferential surface of the movable cylinder,
   ii) zoom actuating means for actuating the movable cylinder for rotation, and
   iii) a lens barrier interlocked with the rotation of the movable cylinder such that the lens barrier operates to open or close an opening section formed in a front cover, through which opening section the movable cylinder moves forwardly and backwardly, in accordance with the rotation of the movable cylinder,
   wherein the helicoid mechanism is provided with an unengaged region, in which the internal helicoid and the external helicoid are in an unengaged state, within a rotation region between a collapsed state of the movable cylinder and a wide end of the movable cylinder, and
   the opening or closing operation of the lens barrier is performed by the rotation of the movable cylinder in the unengaged region of the helicoid mechanism.

2. A zoom actuating apparatus for a camera as defined in claim 1 wherein a projecting or retracting operation of an electronic flashlight is also performed by the rotation of the movable cylinder in the unengaged region of the helicoid mechanism.

3. A zoom actuating apparatus for a camera as defined in claim 1 or 2 wherein the helicoid mechanism comprises:
   a) a flat section, which is formed at a certain part of the internal helicoid of the fixed cylinder, the flat section extending in a direction normal to the optical axis direction and at a position of an end of the internal helicoid,
   b) a cam groove, which continues from the flat section and extends in parallel with the internal helicoid, a groove wall of the cam groove, which groove wall is formed on the side opposite to the flat section, is projected beyond the position of the flat section, and
   c) a protrusion, which is formed at a certain part of the external helicoid of the movable cylinder and is capable of coming into engagement with the cam groove from a state in abutment with the flat section, and
   the state, in which the protrusion is in abutment with the flat section, is set as the unengaged region of the helicoid mechanism.

* * * * *